United States Patent [19]

Ishikawa et al.

[11] Patent Number: 4,933,768

[45] Date of Patent: Jun. 12, 1990

[54] SOUND REPRODUCER

[75] Inventors: Tsutomu Ishikawa; Ryuichi Ogawa; Masaya Tanno; Fumio Tosaka, all of Gunma; Hirofumi Okada; Takayuki Imaida, both of Osaka, all of Japan

[73] Assignee: Sanyo Electric Co., Ltd., Moriguchi, Japan

[21] Appl. No.: 381,923

[22] Filed: Jul. 19, 1989

[30] Foreign Application Priority Data

Jul. 20, 1988 [JP] Japan .............................. 63-96021[U]
Jul. 20, 1988 [JP] Japan .............................. 63-180512

[51] Int. Cl.[5] .......................... H04N 5/60; H04S 3/00

[52] U.S. Cl. .......................................... 358/198; 381/1; 381/17; 381/18; 381/20; 381/21; 381/22; 381/23

[58] Field of Search .................... 381/17, 1, 20, 21, 22, 381/18, 19, 2, 3, 4, 5, 6, 7, 8–11; 358/198, 41, 56, 189, 196; 340/721; 352/11

[56] References Cited

U.S. PATENT DOCUMENTS 4,385,814 5/1983 Elliott .................................. 352/11
4,577,188 3/1986 Inami et al. ......................... 340/721
4,799,260 1/1989 Handell et al. ....................... 381/22
4,817,149 3/1989 Myers .................................... 381/1

FOREIGN PATENT DOCUMENTS 0276948 8/1988 European Pat. Off. ................ 381/1
61-251400 11/1986 Japan .
2154835 9/1985 United Kingdom .................. 381/18

*Primary Examiner*—Howard W. Britton
*Assistant Examiner*—Michael Lee
*Attorney, Agent, or Firm*—Armstrong, Nikaido, Marmelstein, Kubovcik & Murray

[57] ABSTRACT

A television receiver includes a volume control circuit (4) for controlling levels of sound signals corresponding to a left channel, a right channel, a center channel and a surround channel and speakers (6 to 10) corresponding to these channels. The television receiver further comprises a test tone circuit (11; 18), a microcomputer (14) and a character display circuit (16). The test tone circuit (11; 18) supplies a test tone of a prescribed frequency sequentially to the speakers (6 to 10) through the volume control circuit (4). The microcomputer (14) provides a command to the character display circuit (16) so that a CRT 17) displays which speaker is currently supplied with the test tone as well as volume levels of the respective speakers.

13 Claims, 5 Drawing Sheets

SOUND REPRODUCER

BACKGROUND OF THE INVENTION

1. Field of the Invention

The present invention relates to a sound reproducer, and more particularly, it relates to a sound reproducer for reproducing sound signals corresponding to a plurality of channels.

2. Description of the Background Art

Television receivers containing various types of surrounding circuits have been increased in recent years. Particularly according to the Dolby surround system (trade mark in the name of Dolby Laboratories Licensing Corporation), the user can enjoy stereophonic sound with feeling of presence at a theater in his own room by reproducing VTR software or video disk software recorded in the Dolby surround system.

In the aforementioned Dolby surround system, however, it is impossible in principle to attain a sound effect absolutely identical to that at a theater.

Japanese Patent Laying-Open Gazette No. 251400/1986 discloses a Pro-Logic surround system (trade mark in the name of Dolby Laboratories Licensing Corporation) which contains a directional enhancement circuit, as an extended system of the aforementioned Dolby surround system. While difference signal components of left and right sound signals are reproduced by rear speakers to attain feeling of presence in the Dolby surround system, localization and the feeling of presence are improved in the Pro-Logic surround system with additional processing of clarifying directivity of the sound. According to this Prologic surround system, the sound is reproduced by front speakers for left, right and center channels and a pair of rear speakers for a surround channel.

FIG. 1 shows the aforementioned Pro-Logic surround system. Referring to FIG. 1, left and right input terminals 1 and 2 are supplied with left and right stereo signals (sound signals) L' and R', which have been encoded in accordance with the Dolby surround system. A first adder 3 adds the right stereo signal R' to the left stereo signal L', to generate a sum signal C' (=L'+R'). A substracter 4 substracts the right stereo signal R' from the left stereo signal L', to generate a difference signal S' (=L'−R'). First and second detectors 5 and 6 detect levels of the left and right stereo signals L' and R' respectively. Third and fourth detectors 7 and 8 detect levels of the sum signal C' and the difference signal S' respectively. A first level ratio detector 9 detects the level ratio of output signals of the first and second detectors 5 and 6. A second level ratio detector 10 detects the level ratio of output signals of the third and fourth detectors 7 and 8.

A VCA (voltage control amplifier) 11 controls the levels of the left and right stereo signals L' and R' in accordance with output signals of the first and second level ratio detectors 9 and 10. A second adder 12 selects the left and right stereo signals L' and R' and one of output signals of the VCA 11, and adds up the same to generate left and right stereo output signals (left and right channel signals) L and R, a center output signal (center channel signal) C and a surround output signal (surround channel signal) S. A center mode control circuit 13 switches the left and right stereo output signals L and R and the center output signal C in accordance with modes. A passive decoder 14 performs signal processing such as delay, noise removal etc. on the surround output signal S.

The aforementioned Pro-Logic surround system has a test mode function, so that the user can readily set volume balance (sound field) between the five speakers in a listening position. In this test mode function, the speakers sequentially regenerate random noise having central frequency at 500 Hz by one to two seconds, so that the user controls the volume balance between the respective speakers.

However, a conventional Pro-Logic surround decoder has no means of clearly displaying which speaker is currently driven at what volume level, and hence it is difficult for the user to correctly control the sound volume.

SUMMARY OF THE INVENTION

An object of the present invention is to provide a sound reproducer, which can extremely easily control volume balance between respective speakers in a test mode.

The sound reproducer according to the present invention comprises a volume controller, a plurality of sound regenerators, a test signal supply unit and a display unit. The volume controller controls levels of sound signals corresponding to a plurality of channels. The plurality of sound regenerators are provided in correspondence to the plurality of channels, and regenerate the sound signals controlled by the volume controller respectively. The test signal supply unit supplies a test signal of a prescribed frequency sequentially to the plurality of sound regenerators. The display unit displays which sound regenerator is currently supplied with the test signal. In the sound reproducer according to the present invention, the sound regenerator currently receiving the test signal is displayed on the display unit in association with sequential supply of the test signal to the plurality of sound regenerators in a test mode.

Thus, when the user controls the volume levels of the respective sound regenerators in the test mode, the display unit shows which sound regenerator is currently driven. Therefore, the user can confirm the currently driven sound regenerator at a glance, so that he can easily control the volume levels of the sound regenerators.

According to another aspect of the present invention, the display unit displays which sound regenerator corresponding to what channel is currently supplied with the test signal, as well as respective volume levels of the plurality of channels. Thus, the user can confirm the currently driven sound regenerator and its sound volume at a glance, so that he can extremely easily control the volume levels corresponding to the respective sound regenerators. Further, erroneous connection of the sound regenerator can be easily confirmed.

These and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are now described in detail with reference to the accompanying drawings.

Figure 1:
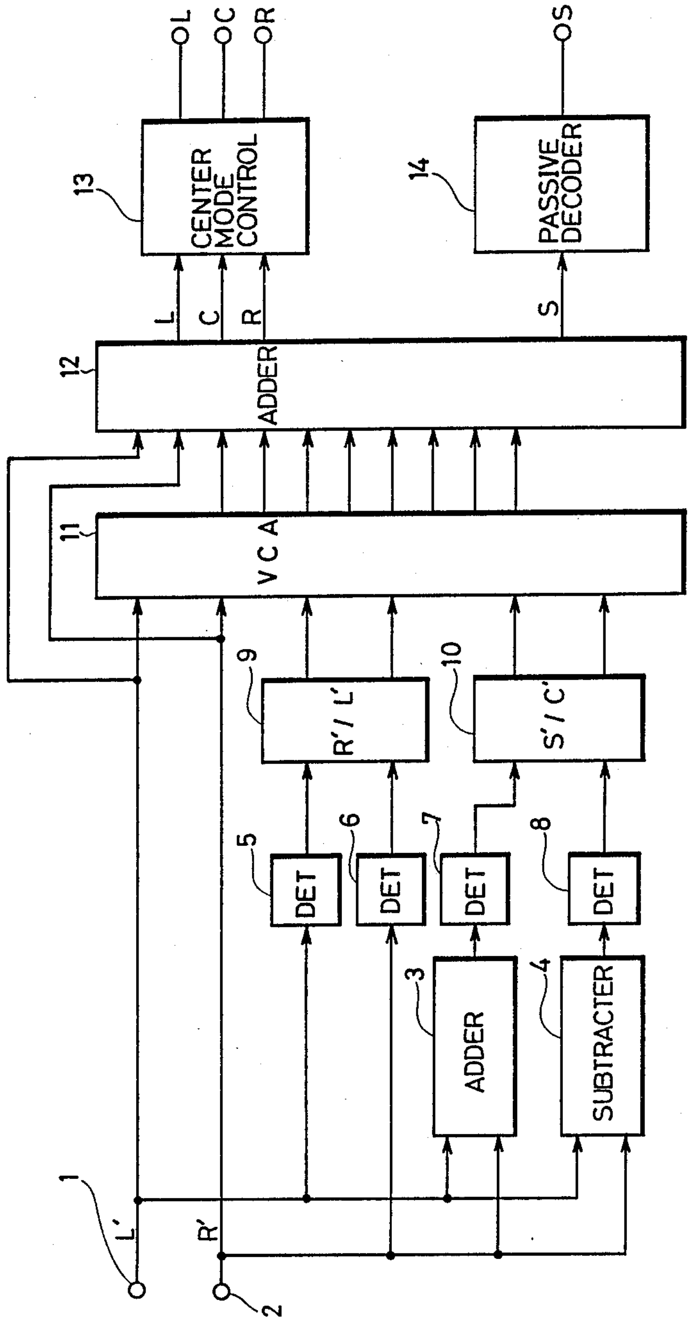
FIG.1 PRIOR ART
FIG. 1 is a block diagram for illustrating a surround system.
Figure 2:
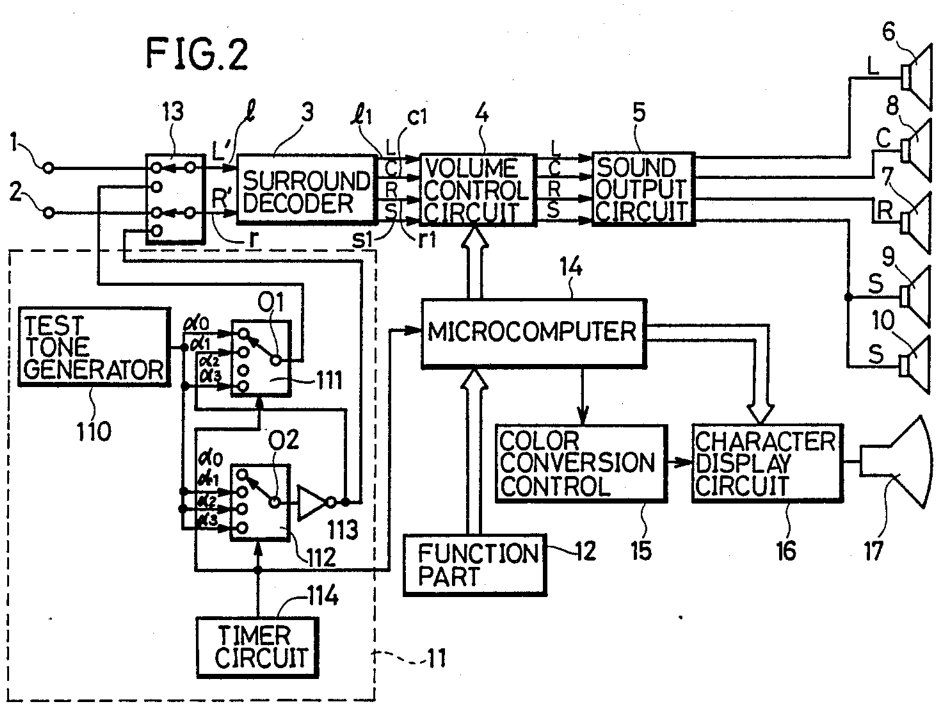
FIG. 2 is a block diagram showing a television receiver according to an embodiment of the present invention.

FIG. 2 is a block diagram schematically showing the structure of a principal part of a television receiver according to an embodiment of the present invention. Referring to FIG. 2, input terminals 1 and 2 are supplied with two-channel sound signals L' and R', which have been obtained by encoding four-channel sound signals in accordance with the Dolby surround system. The four-channel sound signals include a left channel signal L, a right channel signal R, a center channel signal C and a surround channel signal S.

A surround decoder 3 contains a directivity enhancing circuit which receives the sound signals L' and R' and decodes the same through the Pro-Logic surround system to output the left channel signal L, the right channel signal R, the center channel signal C and the surround channel signal S. A volume control circuit 4 controls levels of the signals outputted from the surround decoder 3 respectively. An audio output circuit 5 amplifies the signals controlled by the volume control circuit 4. A left channel speaker 6 is arranged on a front left position to receive the left channel signal L. A right channel speaker 7 is arranged on a front right position to receive the right channel signal R. A center channel speaker 8 is arranged on a front center position to receive the center channel signal C. Surround speakers 9 and 10 are arranged on rear left and right positions to receive the surround channel signal S.

A test tone circuit 11 supplies a test tone to the surround decoder 3 in place of the sound signals from the input terminals 1 and 2 when a function part 12 of a remote control transmitter selects a test mode. The test tone circuit 11 includes a test tone generator 110, a first transfer switch 111, a second transfer switch 112, an inverter 113 and a timer circuit 114.

The test tone generator 110 generates a test tone of 500 Hz. The first transfer switch 11 has terminals d0 and d3, to which the test tone is supplied. The second transfer switch 112 has terminals d1, d2 and d3, to which the test tone is supplied. The inverter 113 inverts the output from the second transfer switch 112. The output of the inverter 113 is supplied to a terminal d1 of the first transfer switch 111. Outputs of the first transfer switch 111 and the inverter 113 are supplied to a third transfer switch 13. The timer circuit 114 generates a switching signal for sequentially switching the respective ones of the first and second transfer switches 111 and 112 toward the terminals d0 to d3 in a constant cycle of 1.5 sec.

The third transfer switch 13 selects the sound signals from the input terminals 1 and 2 or the output signal from the test tone circuit 11, and supplies the same to the surround decoder 3. A microcomputer 14 receives an operation command signal from the function part 12 and the switching signal from the timer circuit 114, and supplies a volume control signal to the volume control circuit 4. A color conversion control circuit 15 is controlled by a color conversion control signal from the microcomputer 14. A character display circuit 16 is controlled by a color conversion signal outputted from the color conversion control circuit 15. A CRT 17 displays the character display output from the character display circuit 16 on its screen.

Test mode operation of the circuit shown in FIG. 2 is now described with reference to a flow chart shown in FIG. 3.

First, a test mode switch provided in the function part 12 is operated so that the operation command signal is supplied to the microcomputer 14. Thus, the circuit shown in FIG. 2 is set in the test mode (steps S1 and S2 of FIG. 3). In other words, the microcomputer 14 controls the character display circuit 16, and the CRT 17 displays characters shown in FIG. 4 on its screen.

At the same time, the third transfer switch 13 is switched to connect input terminals l and r of the surround decoder 3 to the test tone circuit 11. In the test tone circuit 11, the test tone generator 110 generates the test tone, and the timer circuit 114 generates the switching signal. In response to the switching signal, the respective ones of the first and second transfer switches 111 and 112 are sequentially switched toward the terminals d0 to d3 in the prescribed cycle (1.5 sec.).

That is, when the first and second transfer switches 111 and 112 are set at the terminals d0, the test tone appears only at an output terminal 01 of the first transfer switch 111, so that the same is supplied to the input terminal l of the surround decoder 3. Thus, only a left output terminal l1 of the surround decoder 3 outputs a demodulated test tone, thereby to drive only the left channel speaker 6.

When the first and second transfer switches 111 and 112 are set at the terminals d1, in-phase test tones are inputted in the input terminals l and r of the surround decoder 3. Thus, only a center output terminal c1 of the surround decoder 3 outputs a demodulated test tone, thereby to drive only the center channel speaker 8.

When the first and second transfer switches 111 and 112 are set at the terminals d2, the test tone is inputted only in the input terminal r of the surround decoder 3. Thus, only a right output terminal r1 of the surround decoder 3 outputs a demodulated test tone, thereby to drive only the right channel speaker 7.

When the first and second transfer switches 111 and 112 are set at the terminals d3, opposite-phase test tones are inputted in the input terminals l and r of the surround decoder 3. Thus, only a surround output terminal s1 of the surround decoder 3 outputs a demodulated test tone, thereby to drive only the surround channel speakers 9 and 10.

The speakers are sequentially switched and driven every 1.5 sec. in the aforementioned manner.

On the other hand, the switching signal outputted from the timer circuit 114 is also supplied to the microcomputer 14. Thus, the microcomputer 14 decides which speaker currently outputs the test tone (step S3), and supplies the color conversion control signal to the color conversion control circuit 15 in accordance with the result of the decision to control the same, while controlling the character display circuit 16 in accordance with the color conversion signal outputted from the color conversion control circuit 15. When the left channel speaker 6 currently outputs the test tone, for example, the characters "FRONT" and the balance symbol "L" are displayed in a color which is different from that of other characters shown in FIG. 4 (step S4).

Figure 4:
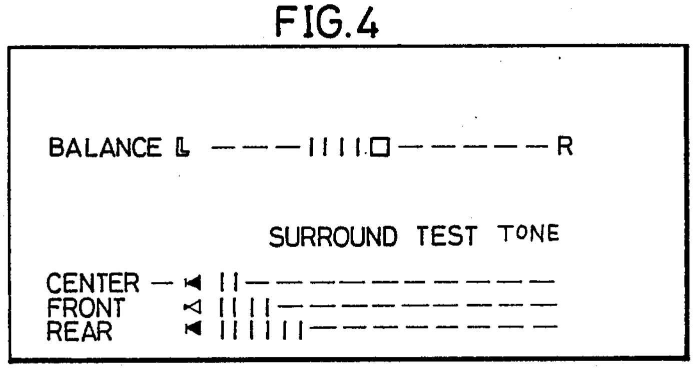
FIG. 4 illustrates an exemplary display mode of a CRT included in the television receiver shown in FIG. 2.

Therefore, the user can recognize that the left channel speaker 6 is currently driven. Thus, the user can control the sound volume of the left channel speaker 6 by operating a volume control key provided in the function part 12 (steps S5 and S6). Referring to FIG. 4 showing screen display, the volume levels of the respective speakers are expressed by the numbers of thick vertical bars.

Figure 3:
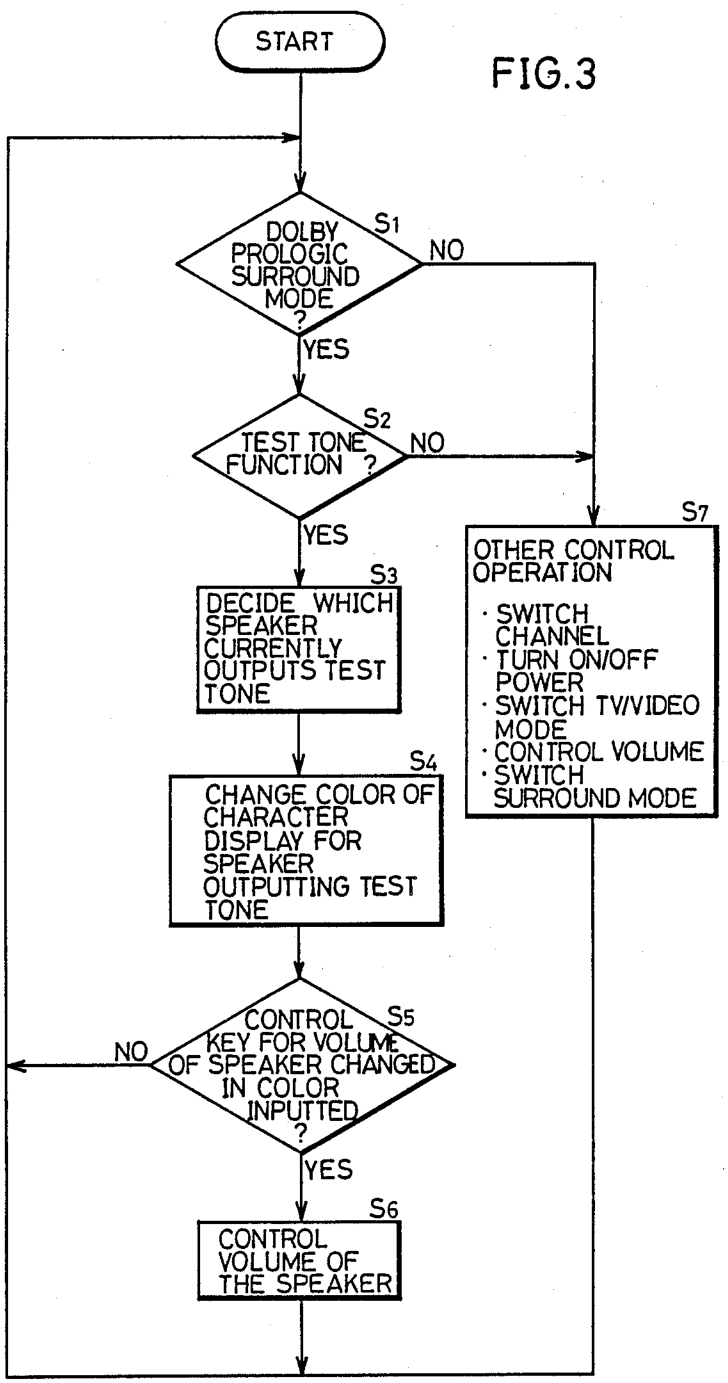
FIG. 3 is a flow chart for illustrating the operation of the television receiver shown in FIG. 2.

When a decision is made that the circuit is not set in the Dolby Pro-Logic surround mode at the step S1 of FIG. 3 or that the circuit is not set in the test mode at the step S2, other control operation is performed to switch the channel, turn on/off power, switch a television/video mode, control the volume, switch the surround mode or the like.

Figure 5:
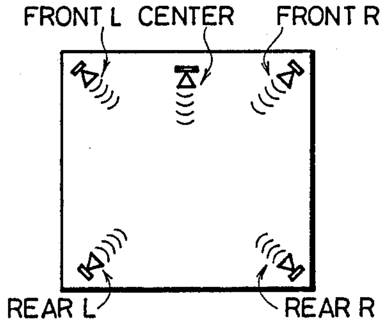
FIG. 5 illustrates another exemplary display mode of the CRT included in the television receiver shown in FIG. 2.

FIG. 5 shows another example of on-screen volume display. In the example shown in FIG. 5, volume levels of the respective speakers are displayed on five positions of the screen in correspondence to actual speaker positions.

In the aforementioned embodiment, the characters showing the speaker currently outputting the test tone are displayed in a color different from that of the characters corresponding to the remaining speakers. Alternatively, the characters corresponding to the speaker currently outputting the test tone may be changed in brightness or flashed, for example. The point is that the speaker currently outputting the test tone can be identified by changing the mode of display corresponding to the speaker.

Figure 6:
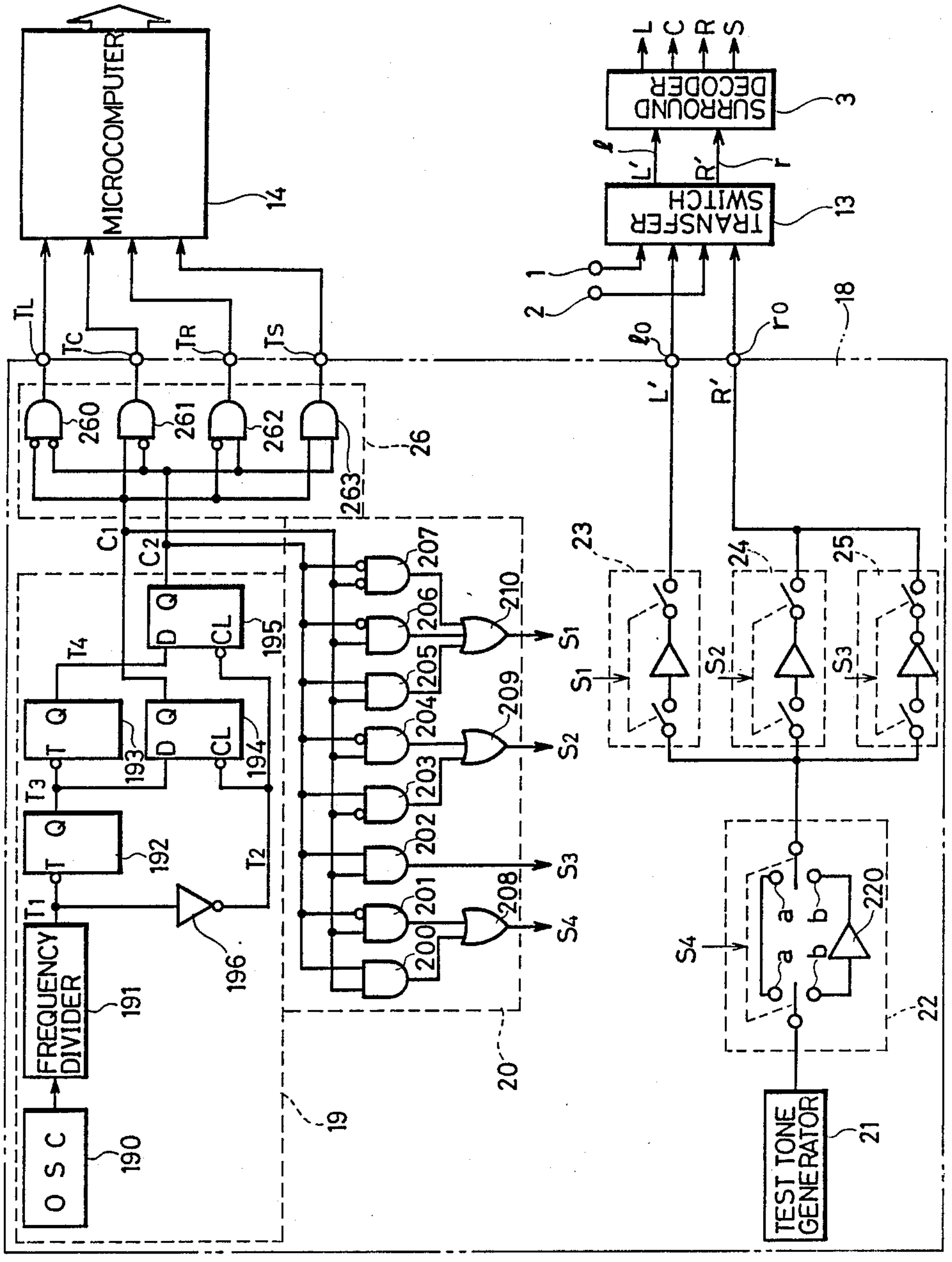
FIG. 6 is a block diagram showing another example of a test tone circuit.
Figure 7:
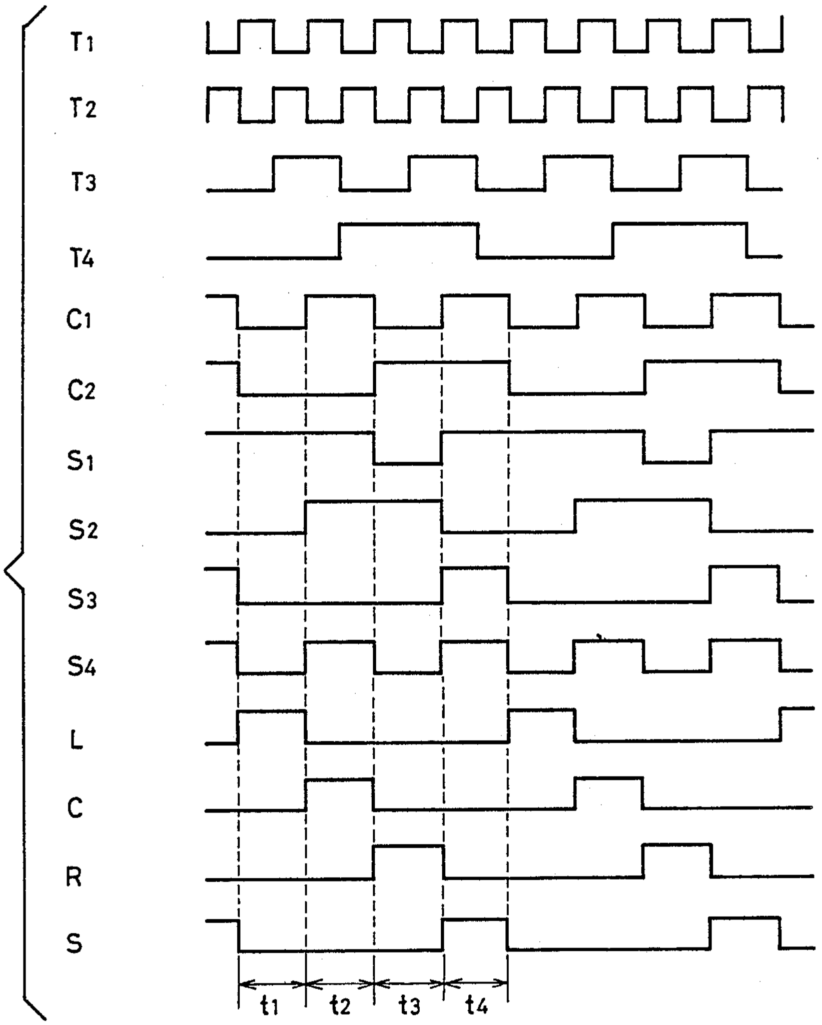
FIG. 7 is a timing chart for illustrating the operation of the test tone circuit shown in FIG. 6.

With reference to FIGS. 6 and 7, another embodiment of the present invention is now described. In this embodiment, a test tone circuit is integrated into an IC.

Referring to FIG. 6, an integrated test tone circuit 18 is enclosed by two-dot chain lines. The test tone circuit 18 includes a timer circuit 19, a first decoder 20, a test tone generator 21, a first switching circuit 22, a second switching circuit 23, a third switching circuit 24, a fourth switching circuit 25 and a second decoder 26.

The timer circuit 19 includes an oscillator 190 of 30 KHz, a frequency divider 191 which divides the output of the oscillator 190 by 24576 to generate a signal of 1.22 Hz, T-flip-flops 192 and 193, D-flip-flops 194 and 195 and an inverter 196. The first decoder 20 includes eight AND gates 200 to 207 and three OR gates 208 to 210. The first decoder 20 decodes timing signals C1 and C2 outputted from the timer circuit 19, to output control signals S1 to S4.

The first switching circuit 22 is controlled by the control signal S4. This first switching circuit 22 directly outputs a test tone received from the test tone generator 21 when a left or right channel speaker is driven, while attenuating the test tone by −3 dB in an amplifier 220 and outputting the same when a center or surround channel speaker is driven.

The second and third switching circuits 23 and 24 include buffer amplifiers and switches respectively. The second and third switching circuits 23 and 24 are controlled by the control signals S1 and S2 respectively. The fourth switching circuit 25 includes an inverter and a switch, and is controlled by the control signal S3. The output of the second switching circuit 23 is inputted in an input terminal l of a surround decoder 3 through a third transfer switch 13, while outputs of the third and fourth switching circuits 24 and 25 are coupled with each other and inputted in another input terminal r of the surround decoder 3 through the third transfer switch 13.

The second decoder 26 includes AND gates 260 to 263. This second decoder 26 decodes the timing signals C1 and C2 outputted from the timer circuit 19, to sequentially derive high outputs at output terminals TL, TC, TR and TS.

The operation of the circuit shown in FIG. 6 is now described with reference to the timing chart shown in FIG. 7.

The first decoder 20 decodes the timing signals C1 and C2 outputted from the timer circuit 19, to obtain the control signals S1 to S4.

In a period t1, the first switching circuit 22 is switched toward contacts a and a in response to the control signal S4. Thus, the test tone is directly supplied to the first to fourth switching circuits 23 to 25. In response to the control signals s1 to S3, the second switching circuit 23 is closed and the third and fourth switching circuits 24 and 25 are opened. Thus, the test tone is outputted only at an output terminal l0.

Then, in a period t2, the first switching circuit 22 is switched toward contacts b and b. Thus, the test tone is attenuated by −3 dB. The second and third switching circuits 23 and 24 are closed and the fourth switching circuit 25 is opened. Thus, in-phase test tones are outputted at the output terminal l0 and r0.

Then, in a period t3, the first switching circuit 22 is again switched toward the contacts a and a. Thus, the test tone is outputted with no attenuation. The second switching circuit 23 is opened and the third switching circuit 24 is closed, while the fourth switching circuit 25 is opened. Thus, the test tone is outputted only at the output terminal r0.

Then, in a period t4, the first switching circuit 22 is again switched toward the contacts b and b. Thus, the test tone is attenuated by −3 dB. The second switching circuit 23 is closed and the third switching circuit 24 is opened, while the fourth switching circuit 25 is closed. Thus, opposite-phase test tones are outputted at the output terminals l0 and r0.

On the other hand, the timing signals C1 and C2 outputted from the timer circuit 19 are also supplied to the second decoder 26. Thus, high outputs are derived at the output terminals TL, TC, TR and TS in the periods t1, t2, t3 and t4 respectively. The outputs are supplied to the microcomputer 14, so that the microcomputer 14 can decide which speaker currently outputs the test tone.

According to this embodiment, as hereinabove described, a CRT displays which speaker currently outputs the test tone by changing the display mode when the user controls the volume levels of the respective speakers in a surround test mode. Thus, the user can confirm the currently driven speaker and its volume at a glance, to extremely easily control the sound volume. Further, erroneous connection of the speaker can be easily confirmed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A sound reproducer for reproducing sound signals corresponding to a plurality of channels, comprising:

volume control means (4) for controlling levels of said sound signals corresponding to said plurality of channels respectively;

a plurality of sound regenerating means (6 to 10) provided in correspondence to said plurality of channels for regenerating said sound signals controlled by said volume control means (4) respectively;

test signal supply means (11) for supplying a test signal of a prescribed frequency to said plurality of sound regenerating means (6 to 10) through said volume control means (4); and display means (14 to 17) for displaying which sound regenerating means is currently supplied with said test signal.

2. A sound reproducer in accordance with claim 1, wherein said plurality of sound regenerating means are a plurality of speaker means (6 to 10), said test signal supply means is test tone supply means (11), and said test signal is a test tone.

3. A sound reproducer in accordance with claim 2, wherein said plurality of channels include first, second, third and fourth channels, said test tone supply means (11; 18) includes:

test tone generating means (110; 21) for generating a test tone of a prescribed frequency, control signal generating means (114; 19, 20, 26) for generating a control signal in a prescribed cycle, and switching means (111 to 113; 22 to 25) for supplying said test tone to said plurality of speaker means (6 to 10) through said volume control means every prescribed period in response to said control signal, and said display means includes:

control means (14, 15, 16) for outputting a command signal commanding display of speaker means currently supplied with said test tone in response to said control signal from said control signal generating means, and a display unit (17) for making display along said command signal in response to said command signal from said control means (14, 15, 16).

4. A sound reproducer in accordance with claim 3, wherein said control signal generating means includes:

timer means (19) for generating a pair of timing signals having different cycles, a first decoder (2) for decoding said timing signals for generating a plurality of first control signals, and a second decoder (26) for decoding said timing signals for generating a plurality of second control signals corresponding to said four channels, and said control means (14 to 16) for making the speaker means currently supplied with said test tone displayed on said display unit (17) in response to said second control signals from said second decoder (26).

5. A sound reproducer in accordance with claim 3, wherein said control means (14 to 16) make display corresponding to the speaker means currently supplied with said test tone different from that corresponding to remaining said speaker means.

6. A sound reproducer in accordance with claim 3, further including decoder means (3) having first and second input terminals (l, r) receiving two-channel sound signals obtained by decoding four-channel sound signals and decoding said two-channel sound signals for outputting sound signals corresponding to four channels, wherein said switching means (111 to 113) supply said test tone to said first input terminal (l) of said decoder means (3) at first timing, an inverted signal of said test tone to said first and second input terminals (l, r) of said decoder means (3) at second timing, said inverted signal of said test tone to said second input terminal (r) of said decoder means (3) at third timing, and said test tone and said inverted signal of said test tone to said first and second input terminals (l, r) of said decoder means (3) at fourth timing respectively.

7. A sound reproducer in accordance with claim 6, further including first switching means (13) for supplying either received said two-channel sound signals or said test tone to said decoder means (3).

8. A sound reproducer in accordance with claim 3, further including decoder means (3) having first and second input terminals (l, r) receiving two-channel sound signals obtained by encoding four-channel sound signals and decoding said two-channel sound signals for outputting sound signals corresponding to four channels, wherein said switching means (22 to 25) supply said test tone to said first input terminal (l) of said decoder means (3) at first timing, a signal obtained by attenuating said test tone to said first and second input terminals (l, r) of said decoder means (3) at second timing, said test tone to said second input terminal (r) of said decoder means (3) at third timing and said signal obtained by attenuating said test tone and an inverted signal of said signal obtained by attenuating said test tone to said first and second input terminals (l, r) of said decoder means (3) at fourth timing respectively.

9. A sound reproducer in accordance with claim 8, further including first switching means (13) for supplying either received said two-channel sound signals or said test tone to said decoder means (3).

10. A sound reproducer for reproducing sound signals corresponding to a plurality of channels, comprising:

volume control means (4) for controlling levels of said sound signals corresponding to said plurality of channels respectively;

a plurality of sound regenerating means (6 to 10) provided in correspondence to said plurality of channels for regenerating said sound signals controlled by said volume control means (4) respectively;

test signal supply means (11) for supplying a test signal of a prescribed frequency to said plurality of sound regenerating means (6 to 10) through said volume control means (4); and display means (14 to 17) for displaying volume levels corresponding to said plurality of channels, as well as which sound regenerating means is currently supplied with said test signal.

11. A television receiver having a television screen (17) and reproducing sound signals corresponding to a plurality of channels, comprising:

volume control means (14) for controlling levels of said sound signals corresponding to said plurality of channels respectively;

a plurality of speaker means (6 to 10) provided in correspondence to said plurality of channels for regenerating said sound signals controlled by said volume control means (4) respectively;

test tone supply means (11; 18) for supplying a test tone of a prescribed frequency to said plurality of speaker means (6 to 10) through said volume control means (4) every prescribed period; and display means (14 to 16) for displaying which speaker means is currently supplied with said test tone on said television screen (17).

12. A television receiver in accordance with claim 11, wherein said display means (14 to 16) further display volume levels corresponding to said plurality of channels on said television screen (17).

13. A television receiver in accordance with claim 12, wherein said plurality of channels include first, second, third and fourth channels, said test tone supply means (11; 18) includes:

test tone generating means (110; 21) for generating a test tone of a prescribed frequency, control signal generating means (114; 19, 20, 26) for generating a control signal in a prescribed cycle, and switching means (111 to 113, 22 to 25) for supplying said test tone to said plurality of speaker means (6 to 10) through said volume control means (4) every prescribed period in response to said control signal, and said display means includes control means (14 to 16) making display indicating the speaker currently supplied with said test tone on said television screen (17) in response to said control signal from said control signal generating means (114; 19, 20, 26).

* * * * *

UNITED STATES PATENT AND TRADEMARK OFFICE

CERTIFICATE OF CORRECTION

PATENT NO. : 4,933,768

DATED : June 12, 1990

INVENTOR(S) : ISHIKAWA et al

It is certified that error appears in the above-identified patent and that said Letters Patent is hereby corrected as shown below:

On the cover page, Item [30], after "63-180512" insert --Jun. 13, 1989 [JP] Japan ................. 1-151984--.

Signed and Sealed this

Twenty-sixth Day of November, 1991

*Attest:*

HARRY F. MANBECK, JR.

*Attesting Officer*

*Commissioner of Patents and Trademarks*